W. H. MUZZY.
CASH REGISTER AND MONEY CHANGER.
APPLICATION FILED MAR. 30, 1907.
1,048,860.
Patented Dec. 31, 1912.
7 SHEETS—SHEET 2.
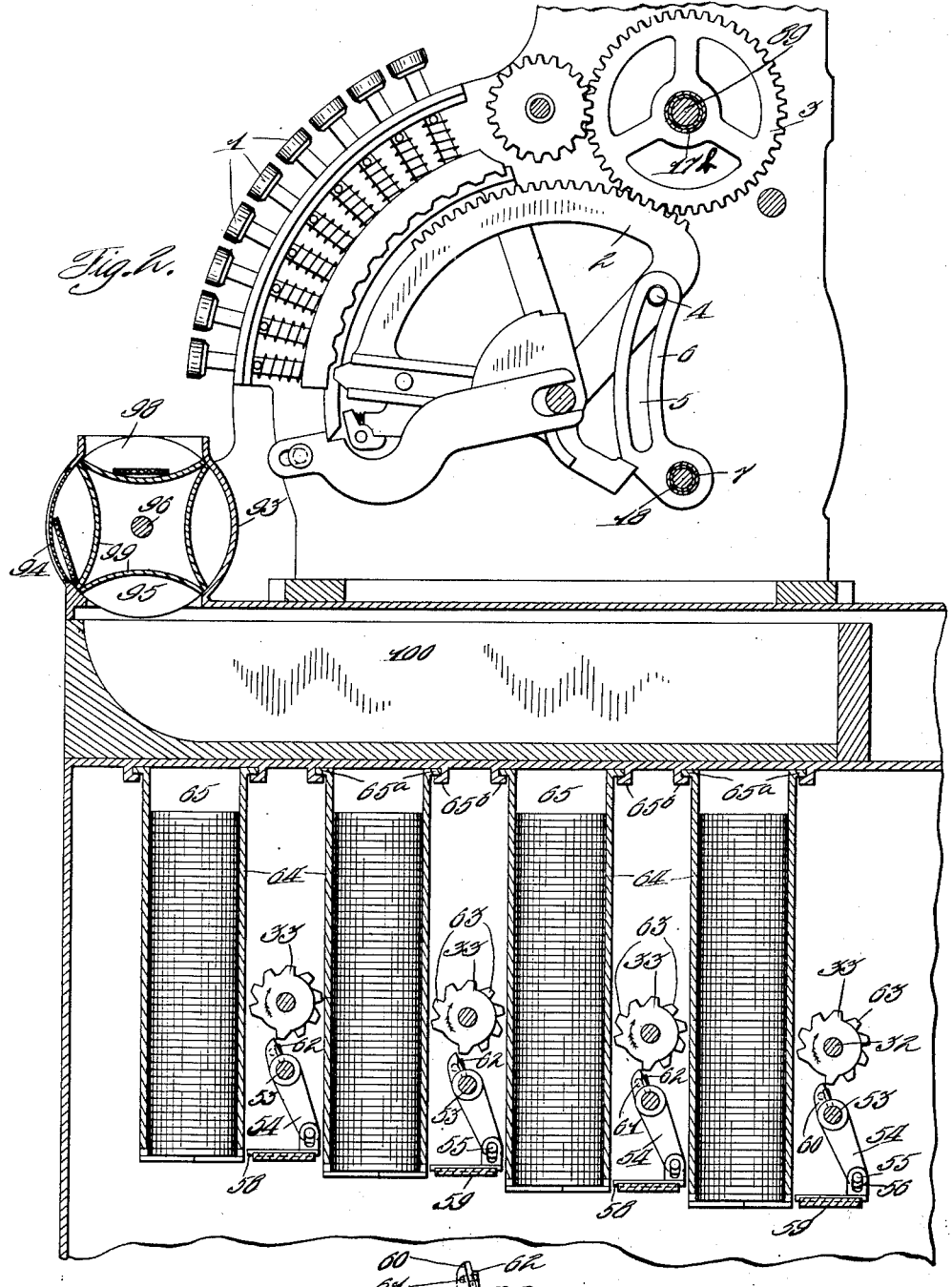
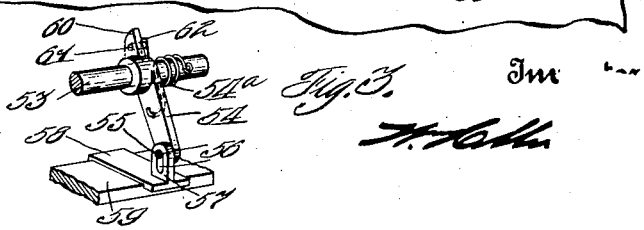

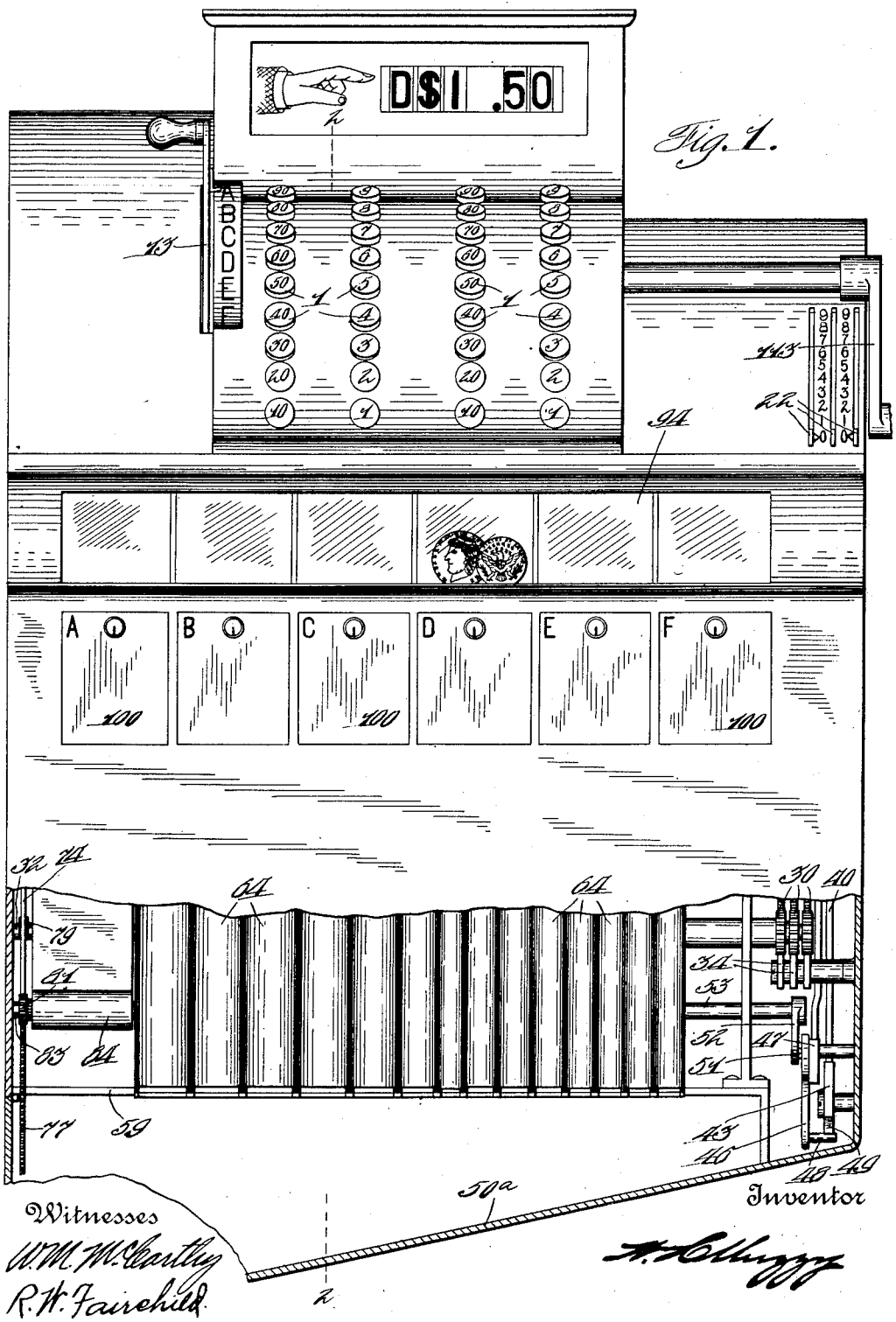

W. H. MUZZY.
CASH REGISTER AND MONEY CHANGER.
APPLICATION FILED MAR. 30, 1907.
1,048,860.
Patented Dec. 31, 1912.
7 SHEETS—SHEET 3.
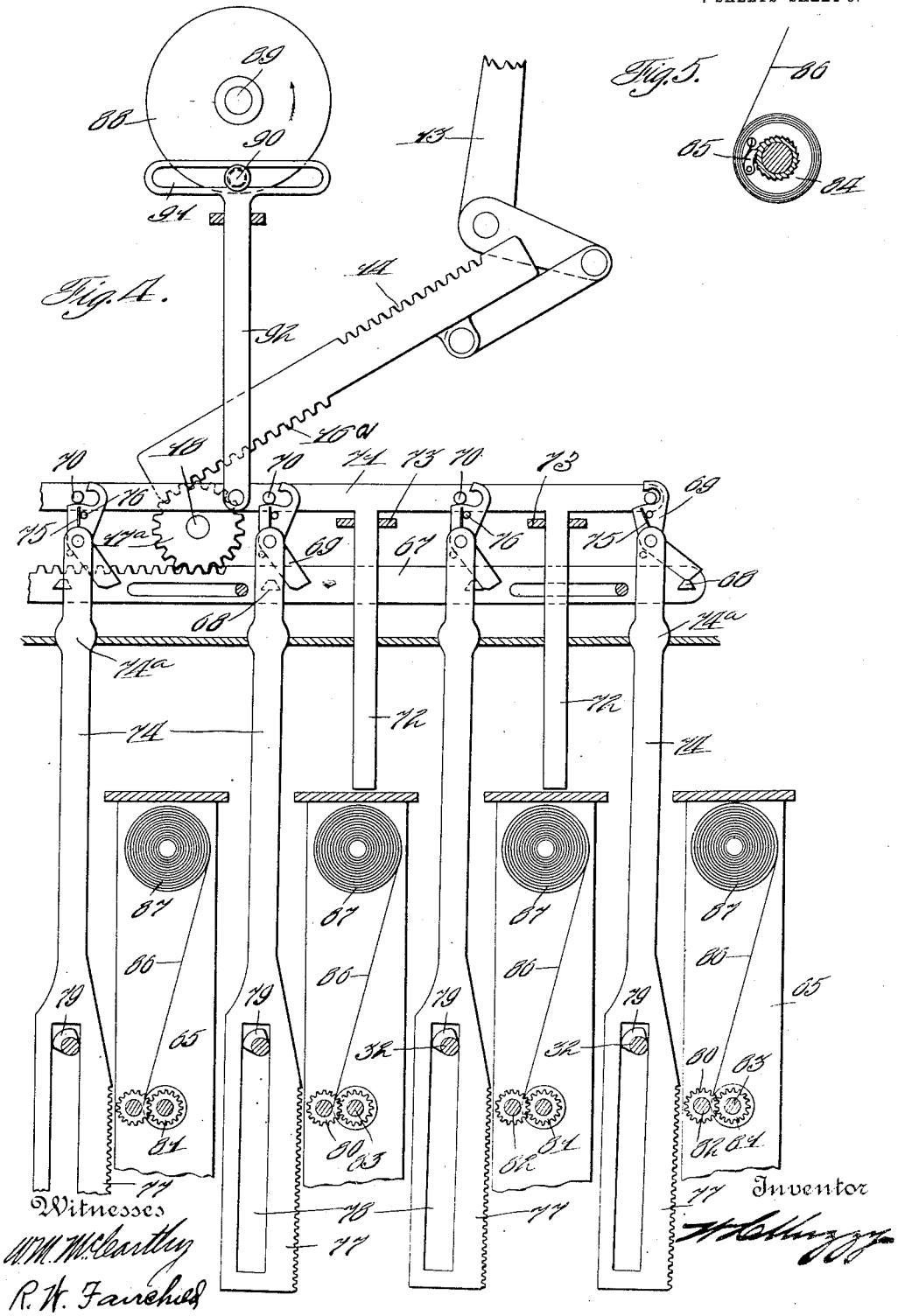

W. H. MUZZY.
CASH REGISTER AND MONEY CHANGER.
APPLICATION FILED MAR. 30, 1907.
1,048,860.
Patented Dec. 31, 1912.
7 SHEETS—SHEET 4.
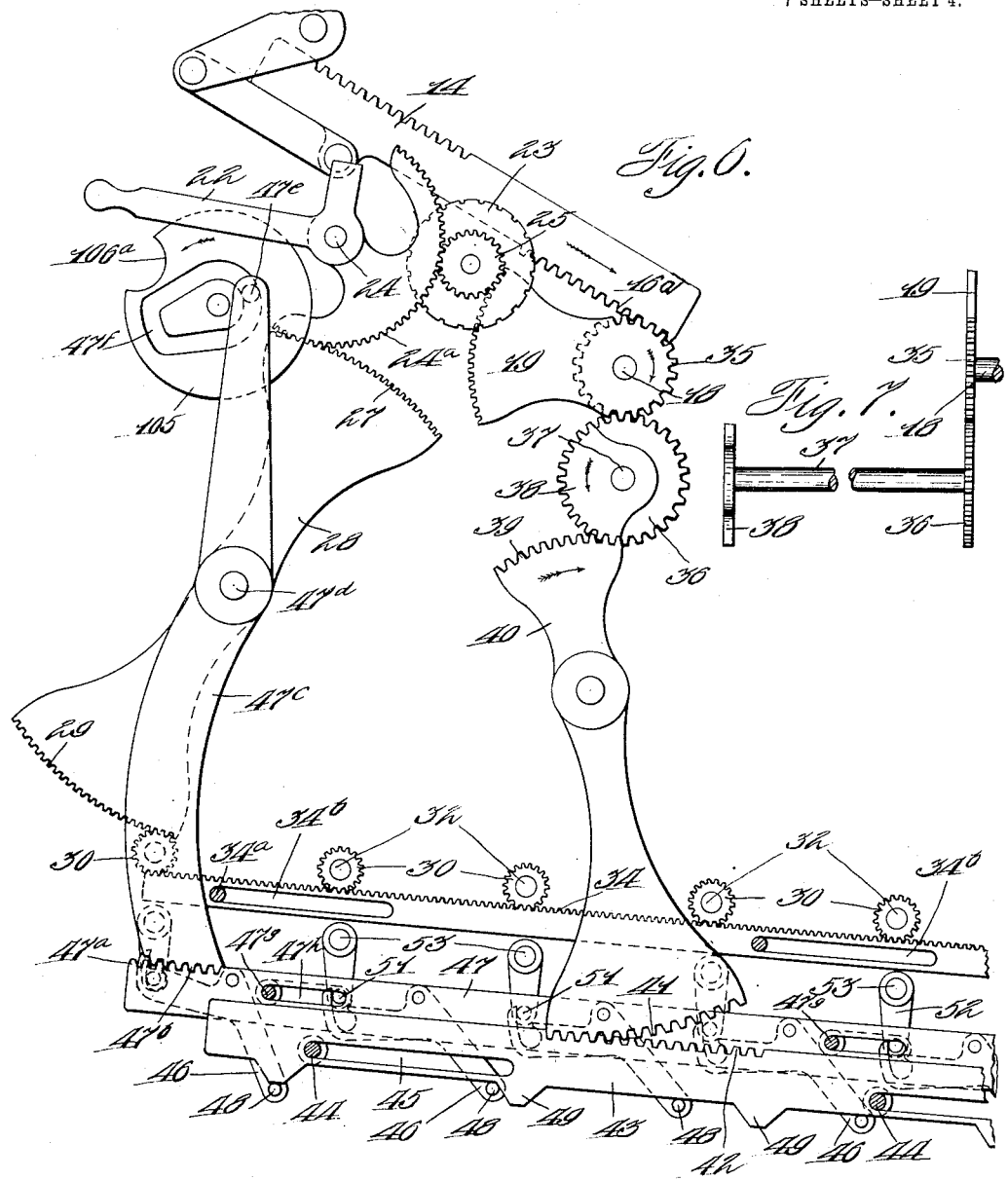
Witnesses
W. M. McCarthy
R. W. Fairchild
Inventor
W. H. Muzzy W. H. MUZZY.
CASH REGISTER AND MONEY CHANGER.
APPLICATION FILED MAR. 30, 1907.
1,048,860.
Patented Dec. 31, 1912.
7 SHEETS—SHEET 5.
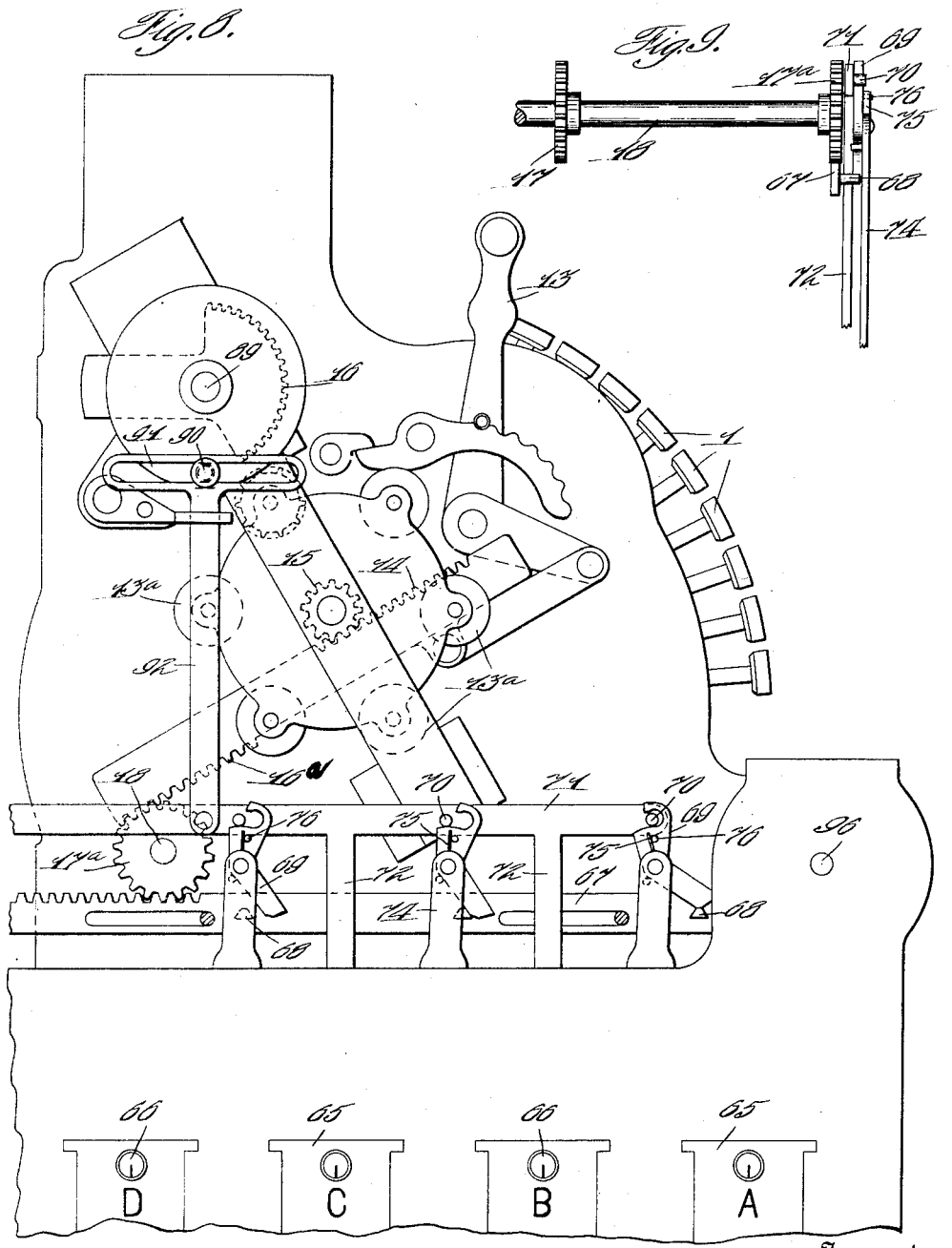

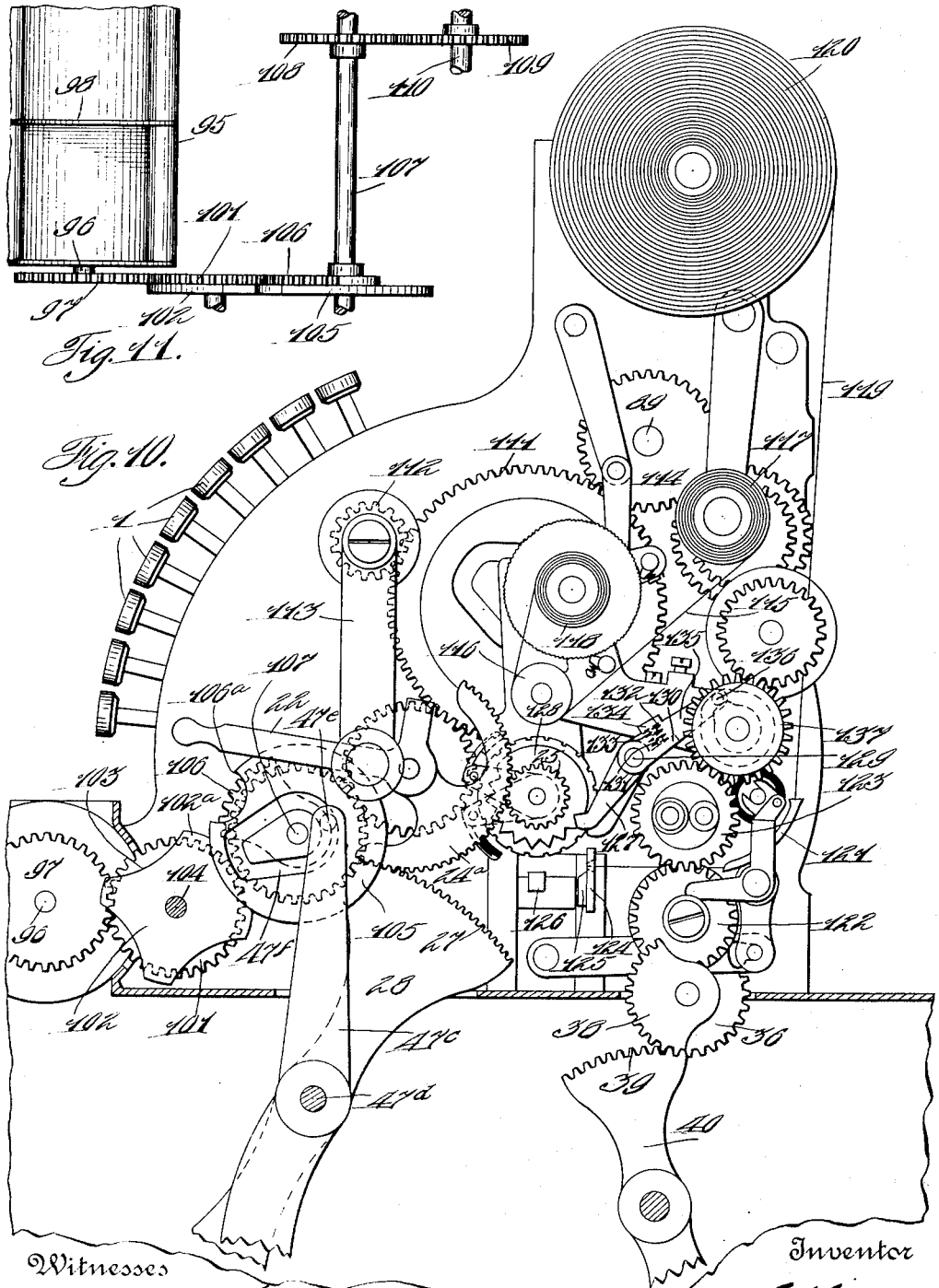

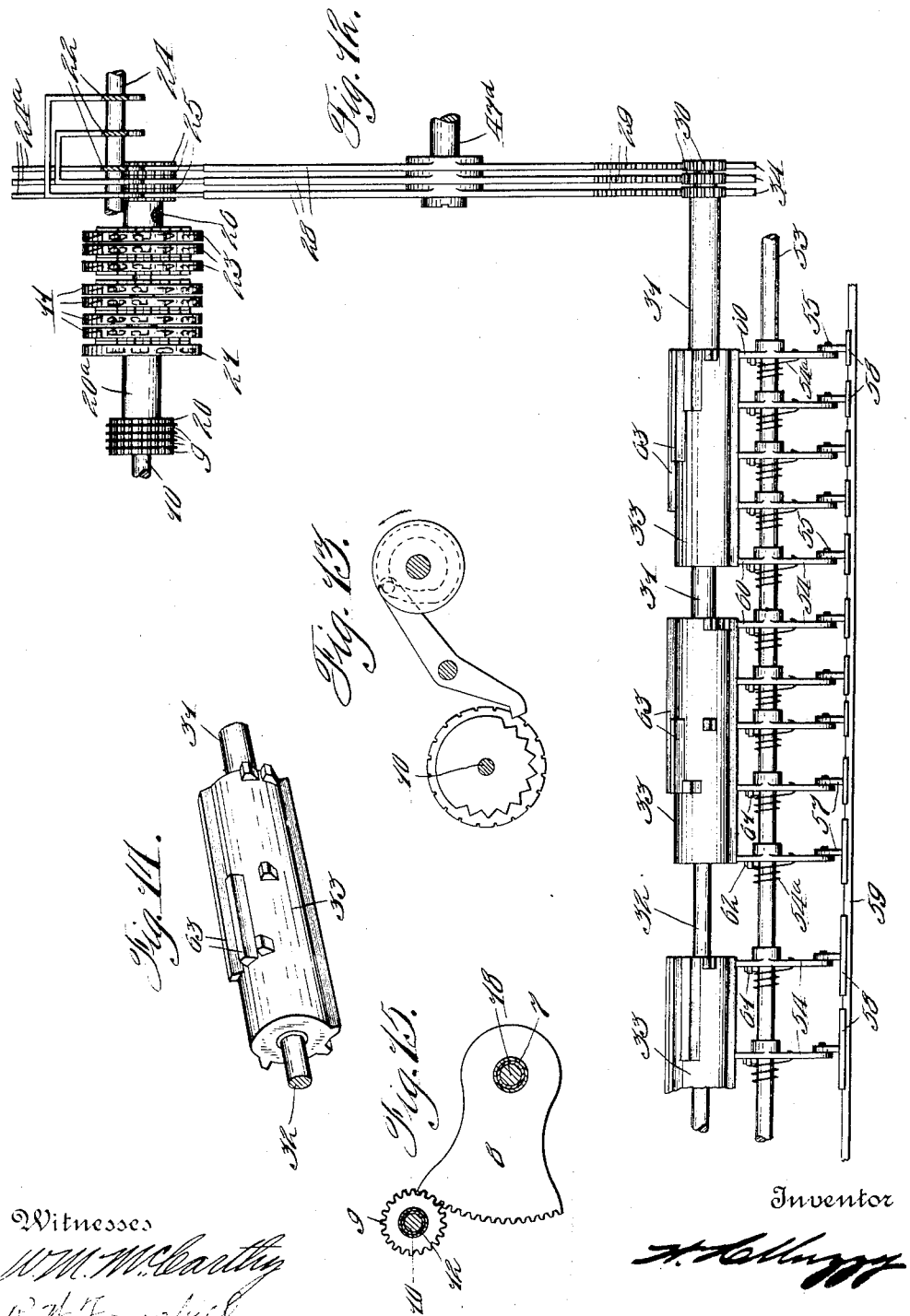

UNITED STATES PATENT OFFICE.

WILLIAM H. MUZZY, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER AND MONEY-CHANGER.

1,048,860.

Specification of Letters Patent.

Patented Dec. 31, 1912.

Application filed March 30, 1907. Serial No. 365,506.

*To all whom it may concern:*

Be it known that I, WILLIAM H. MUZZY, a citizen of the United States, residing at Dayton, in the county of Montgomery and State of Ohio, have invented certain new and useful Improvements in Cash-Registers and Money-Changers, of which I declare the following to be a full, clear, and exact description.

This invention relates to improvements in cash registers, and has more particular relation to improvements in such registers as are provided with devices for handling cash by different clerks.

The object of the invention is to provide mechanism whereby the cash of the several clerks is kept separate and a record made of the amount of sale, together with the amount taken from the machine, by any particular clerk.

With this and incidental objects in view, the invention consists in certain novel features of construction and combination of parts, the essential elements of which are set forth in appended claims and a preferred form of embodiment of which is hereinafter specifically described with reference to the drawings which accompany and form part of this specification.

Of said drawings: Figure 1 represents a front elevation, partly broken away, of the devices embodying my invention. Fig. 2 represents a central vertical section through the same, taken on the line 2—2 of Fig. 1, the upper and lower portion of the machine being broken away. Fig. 3 represents a detail perspective view of one of the ejector slides and its operating arm. Fig. 4 represents a detail side elevation, partly in section, of the bill ejecting devices. Fig. 5 represents a detail vertical section through one of the bill winding rollers. Fig. 6 represents a detail side elevation of the operating devices for the coin ejector controlling cylinders. Fig. 7 represents a detail rear elevation of the gearing for bridging from the inside to the outside of the printing mechanism. Fig. 8 represents a detail side elevation taken from the counter end of the machine. Fig. 9 represents a detail rear elevation of the gearing for bridging from the inside to the outside of the counter frame. Fig. 10 represents an end elevation, partly in section and partly broken away, of the printer end of the machine. Fig. 11 represents a top plan view of a part of the coin displayers and their operating gears. Fig. 12 represents a detail front elevation of the ejector slides, the selecting cams and connections. Fig. 13 represents a detail side elevation of the purchase printer wheels, locking pawls and connections. Fig. 14 represents a detail perspective view of one of the ejector controlling cylinders. Fig. 15 represents a detail sectional view of the purchase printer wheel pinions and their operating segments.

Described in general terms the present machine is designed for the reception of coins into a series of independent coin or bill displayers whereby a particular clerk will display in his particular displayer the amount of money last received by him, this amount of money to be deposited into a shallow tray and to be afterward automatically displayed but at the same time removed beyond withdrawal.

The machine to which I have attached my present improvements is of the multiple counter type equipped with printing attachment, disclosed in patents granted to T. Carroll Nos. 703,369 and 754,049, and for any detailed description of the multiple counter and printing features reference is made to said patents. The machine of the type mentioned is provided with a printing mechanism for printing upon a continuous strip the amount of each sale, together with the designation of the clerk making that particular sale. In the present invention I have widened the printing mechanism so as to print upon the detail strip not only the amount of the sale and the clerk's designation, but also the amount of money withdrawn from the machine by that particular clerk. By this means any mistakes in making change are at once discernible and can be charged to the clerk making such mistake. This is possible because each detail on the detail strip represents the amount of the sale and the amount of change of each transaction, and these two amounts taken together must represent the amount of money presented for change. For instance, if a dollar is presented and the sale is 25¢, the detail strip would have printed thereon, first the clerk's initial, then the 25¢, and then the 75¢ withdrawn from the money changer of that particular clerk. It will be seen that these amounts, that is, 25¢ and 75¢, represent such a denomination of money as could have been presented for change. If the detail strip had shown however, first 25¢ and then 50¢, there would obviously be an error by this particular clerk, as our coinage has not a 75 cent piece that might have been presented for change. Further, if the detail strip had shown 25¢ and 80¢, this would obviously have been a mistake and would show that 5¢ in excess of the proper change had been paid the customer. With this general understanding of the functions to be performed by the machine, I will now describe in detail the several mechanisms by which these results are accomplished.

Each bank of keys or selective devices 1 controls a differentially movable segment 2, Fig. 2, which meshes with an intermediate gear 3, that in turn actuates the registering and indicating mechanisms as disclosed in said patents. Each segment 2 carries a roller 4 which plays in a cam slot 5 formed in an arm 6. These arms 6 are secured to one end of nested sleeves 7, while to the other ends of said sleeves are secured segmental rack plates 8 which mesh with pinions 9, Figs. 12 and 15, mounted upon a shaft 10. The pinions 9 are connected to the amount printing wheels 11 by nested sleeves 12 surrounding said shaft.

By reference to Fig. 8 it will be seen that the setting lever 13 controls the adjustment of the clerks' counters or totalizers 13ª, which are mounted upon a reel, by means of a rack 14 and a pinion 15, so that upon the operation of the machine the counter positioned will be brought into mesh with the segments 16 secured to one end of nested sleeves 17ᵇ, the other ends of which have fastened thereto the intermediate gears 3, for a detail description of which reference may be had to the aforementioned patents.

The rack 14 is provided at its rearward under side with an additional set of teeth 16ª, which meshes with a pinion 17 secured to a shaft 18 near the left hand end, to the other end of which is fastened a segmental rack plate 19, Fig. 6 which in turn meshes with a pinion 20, Fig. 12, made fast to an end of a sleeve 20ª, the other end of said sleeve carrying a clerk's type wheel 21.

The mechanism above described relates to the setting means for the clerks and the amount purchased printing wheels. Next will be described the mechanism for setting the amount of change printing wheels and means controlled thereby for governing the amount of change to be ejected.

Referring to Figs. 6, 10 and 12 it will be seen that levers 22 are provided for setting the change printing wheels 23. These levers are pivotally mounted upon a shaft 24 secured to the side frame of the machine. The inner ends of the two right hand end levers are given a yoke formation so as to extend to the left of the dollars setting lever, and are then with the dollars setting lever extended rearwardly terminating into segmental rack plates 24ª, which mesh with pinions 25 secured to one end of nested sleeves 26, also surrounding the shaft 10, on the other ends of which are fastened the change printing wheels 23. The levers 22, as shown in Fig. 1, extend through the cabinet and are provided with pointers which play over indices on said cabinet. The object of extending the inner ends of the cents and dimes levers to the left of the dollars lever, is to bring the change wheels into proper printing relation with the purchase printing wheels. The segmental rack plates 24ª also mesh with rack teeth 27 formed upon the upper ends of centrally pivoted arms 28, the lower ends of which are also provided with similar rack teeth 29. The teeth 29 mesh with pinions 30 secured to one end of nested sleeves 31 and a shaft 32, the other ends of said sleeves and shaft having secured thereto cylinders 33 for controlling the ejectors.

A series of rack bars 34 meshes with pinions 30 to convey their movements to similar pinions, each forming a part of a plurality of change making devices, one for each clerk. These rack bars are guided upon the frame of the machine by pins 34ª playing in elongated slots 34ᵇ in said bars 34.

The rear end of the plate 19 for setting the clerk's printing wheel is provided with rack teeth 35, Fig. 6, which mesh with a pinion 36 fastened to one end of a short horizontal shaft 37, to the other end of which is secured a segment 38. This segment engages with teeth 39 formed in the upper end of a pivoted arm 40, the lower end of which is provided with a segmental rack 41, that in turn meshes with teeth 42 formed in the edge of a longitudinally movable bar 43 supported by pins 44 which play in elongated slots 45 formed in said bar. The object of extending the shaft 37 and equipping it with the segment 38 to mesh with the teeth 39 of the arm 40, instead of having said teeth engage directly with the pinion 36, is to have the arm 40 operate at the extreme right hand and so as not to interfere with mechanisms hereinafter described.

Bell crank levers 46 pivoted to a forwardly movable slide 47 are equipped at one end with pins 48, which lie under the lower edge of the bar 43, and are arranged to be engaged by cam projections 49 forming a part of the said bar. The other ends 50 of the bell cranks are hook shaped and all but one normally lie out of engagement with pins 51 secured to the lower ends of arms 52, the upper ends of which are fastened to rock shafts 53. The slide 47 at its upward and forward end is provided with teeth 47ª which mesh with teeth 47ᵇ formed in the lower end of an arm 47ᶜ centrally pivoted upon a stub shaft 47ᵈ. The upper end of said arm is provided with a roller 47ᵉ which plays in a cam groove 47ᶠ formed in a disk 105. The slide 47 is mounted upon the casing by means of pins 47ᵍ which play in slots 47ʰ formed in said slide. As before described, one of the bell cranks 46 is always in engagement with its companion pin 51 of the arm 52 secured to one of the rock shafts 53, so that when the slide is moved forward by the rotation of the disk 105, as hereinafter described, one of the shafts 53 will be rocked. The hook ends of the bell cranks 46 are so shaped as not to allow the same to drop out of engagement with its pin 51 after its own pin 48 passes out of engagement with its respective cam projection 49, upon the forward movement of the slide 47. As the latter returns to normal position it will also return the rock shaft by the forward hook end of the bell crank contacting with the pin 51. This forward end of the bell crank is lengthened so as to contact with its pin no matter what position the bell crank is in.

The shafts 53 extend through the machine, Figs. 2 and 3, and each one has loosely mounted upon it a series of ejector arms 54, to each one of which is attached one end of a spring 54ᵃ, the other end of said spring being coiled around the shaft 53 and attached thereto, so that when the shaft is rocked the ejector arm will be rocked with it. The lower end of each arm 54 is provided with a pin 55, which plays in a vertical slot 56 of an upright 57 forming a part of an ejecting slide 58, mounted to slide in a groove formed in a horizontal support 59 fastened to the side frames of the machine. Each arm 54 is also provided with an upwardly extending finger 60 equipped with a laterally projecting pin 61, which is engaged by a pin 62 projecting vertically from the shaft 53, so as to positively return the ejector arm 54. The controlling cylinders 33 are located directly above the arms 54, and are provided with ribs 63 which are arranged to be brought into the path of any one or all of the fingers 60 and thereby prevent the operation of the ejecting slide 58, in which case the coil springs 54 will be put under tension.

Directly in front of each series of slides 58 are coin tubes 64 forming a part of a removable money holder 65. As the slides move forward they eject the bottom coins of their respective tubes, which then run down an incline 50ᵃ, Fig. 1, to a common receptacle not shown. Each holder, as shown in Fig. 8, is provided with a lock 66 and also has the initial of the clerk to whom it belongs stamped upon it. While only four of the holders are shown, it is to be understood that there are to be as many as there are counters 13ᵃ. These holders at their upper ends are provided with flanges 65ᵃ which slide in grooves 65ᵇ formed in the main casing, see Fig. 2.

As shown in Fig. 4 each holder 65 contains a bill delivering device, which will now be described. The shaft 18, which is controlled by the adjusting lever 13, by means of the rack 16 and the pinion 17, is provided at its left hand end with a pinion 17ᵃ, Fig. 9, which meshes with the rack portion of a longitudinally movable slide 67. The object of having the pinion 17ᵃ mesh with the slide 67 instead of having said slide mesh directly with the pinion 17, is to bring the below described mechanism to the left of the multiple counters. Laterally projecting lugs 68, secured to said slide, are arranged to contact with the lower beveled ends of pawls 69, and cam the upper ends into engagement with pins 70 projecting from a vertically movable slide 71. From the slide 71 legs 72 extend downwardly through strips 73, see Fig. 4. These strips act as guides for the vertical movement of the slides 71.

The pawls 69 are pivoted to the upper ends of vertically movable bars 74, and are normally forced out of engagement with the pins 70 by leaf springs 75, mounted in the tops of the bars 74, contacting with laterally extending pins 76 mounted upon the pawls 74. The lower ends of the bars 74 are provided with rack portions 77 and elongated slots 78. Extending through the slots 78 are the shafts 32 of the dollar controlling cylinders 33. These shafts are further provided with cams 79 which engage with the sides of the bars formed by the slots 78. When change is required amounting to five dollars or more, the dollar change lever 22 rotates the shafts 32 to such an extent as to bring the cams 79 into contact with the forward sides of the slots 78, and thereby cam the rack portions 77 of the bars 74 into engagement with the idle pinions 80, which in turn mesh with similar pinions 81. Each bar 74 is provided with an enlarged circular portion 74ᵃ, fitting snugly in a cut out portion of the casing, which acts as a fulcrum when the rack portion 77 is rocked forward or backward.

The pinions 80 and 81 are loosely mounted upon short shafts 82 and 83 respectively, which are supported by the ends of the removable holders 65 and by the end coin tubes 64. Between each pinion 81, and to its companion storage spool 84, is a ratchet and pawl connection 85, Fig. 5, which rotates the spool 84 as its corresponding bar 74 is raised, but has no effect upon said spool as the bar is lowered. Attached to each spool 84 is a tape 86 which extends upwardly and forms a supply spool 87. Whenever it is desired to load the machine the holders are first unlocked and then withdrawn by the proprietor or any designated person, who places in the coin tubes and the bill holders any desired amount. The bill holder is loaded by placing the bills upon the vertical part of the tape and winding the supply spool by hand.

The lugs 68 upon the slide 71 are so situated that, whatever position the adjusting lever 13 is in, one of the lugs 68 contacts with its corresponding pawl 69, and thereby forces its hook end into engagement with one of the pins upon the vertically movable slide 71, so that when the latter is moved upwardly one of the bars 74 is also raised. As before described, if the rack portion 77 of the bar is in engagement with its pinion 82 a bill will be issued from that particular holder and dropped into a receptacle (not shown) from which it may be removed by the attendant. If it is not in engagement with the pinion it will be lifted idly.

The aforementioned vertical movement of the slide 71 is accomplished in the following manner. A cam disk 88 which is secured to the end of the power shaft 89, and which is used to bring the counters and the registering segments into engagement as described in said patents, is provided with an anti-friction roller 90, which plays in a horizontal slot 91 formed in the upper end of a T shaped bar 92, the lower end of which is pivoted to the slide 71. As the disk 88 rotates in the direction of the arrow, Fig. 4, the slide 71 will be first raised and then lowered, carrying whichever bar that may be coupled thereto by the pin and pawl connection. The hook end of each pawl 69 is so shaped that when once started upwardly it is impossible for its leaf spring 75 to disengage the pawl from the pin, without moving the bar 74 in advance of the slide 71, which it is not strong enough to do.

I have described above a single bill holder which is preferably utilized for discharging five dollar bills, thereby permitting full change to be made up to and including amounts to $9.99, according to the quantity of change determined by the setting levers 22. It will of course be understood however, that any number of these bill discharging devices may be employed and controlled by the cams 79 to effect the proper discharge of any number of bills desired. For instance, it might be desirable if four dollars in change were required, to give only two silver dollars and two paper dollars, in which event the projections 63 and 79 would be properly positioned to effect this combination.

Referring to Figs. 2, 10 and 11, the cash displaying and depositing devices will now be described. Extending across the front of the machine and just below the keys, is a cylindrical shaped casing 93 having the upper and lower portions opened. The front of this casing is provided with a glass plate 94, or any other suitable transparent material through which may be seen the amount tendered for the last sale. Fitting closely within this casing is a rotary displayer 95 secured to a shaft 96, the outer end of the latter having secured to it a gear 97, see Fig. 10. This displayer is divided longitudinally into six divisions by disks 98, and each division into four compartments by dish shaped plates 99. As the displayer is only given a quarter turn upon each operation of the machine, by mechanism hereinafter described, it will be seen that each compartment will be brought under the top opening to receive the money and over the lower opening to deposit same within one of the cash drawers 100, of which there are six corresponding to the divisions of the displayer. It will also be apparent that as the money is only deposited in the cash drawer upon the second operation of the machine, it will be displayed behind the glass 94 between the first and second operations. The displayer fits so closely within the casing that it is impossible to withdraw any of the money displayed between the operations of the machine.

The gear 97 fastened to the displayer shaft meshes with a similar gear 101 adjacent to which is a locking plate 102 with four cut away portions 103. The plate 102 and the gear 101 are supported upon a stub shaft 104. Engaging with one of the cut away portions 103 is a disk 105 having attached thereto a segmental rack plate 106 which is secured to one end of a short shaft 107. The disk 105 which is given a complete revolution at each operation of the machine, is provided with a cut out portion 106$^a$ adapted to receive the extensions 102$^a$ of the locking plate 102 during the time the segment 106 is in engagement with the teeth of the gear 101, see Fig. 11. Just as the segment 106 passes out of engagement with the gear 101, the periphery of the disk engages the next cut away portion of the plate 102 and locks it and consequently the displayer 95. To the other end of said shaft 107 is pinned a gear 108 which meshes with a similar gear 109 loosely mounted upon a shaft 110, which also acts as a fulcrum for the change levers 22. The gear 109 meshes with a large intermediate gear 111, see Fig. 10, which in turn engages with the pinion 112 secured to the operating handle 113. The previously described motor shaft 89 has pinned to its right hand end a gear 114, which meshes with the intermediate gear 111 and is also connected to gearing for operating the printing mechanism as fully described in the Patent No. 754,049.

The record strip 115 is fed over a platen 116 from a supply roller 117 to a storage roller 118, and is moved forward as the platen is reciprocated to take an impression from the printing wheels. The check paper 119 is fed downwardly from the supply roll 120 through a chute 121, between a feed roller 122 and printing cylinder 123, between knives 124 and 125, and thence over a platen 126 which is reciprocated upon each operation of the machine as described in Patent No. 754,049.

The clerks and purchase printing wheels are provided with an alining device, Fig. 13, similar to the one described in the above mentioned patent; while the alining device for the change printing wheels is slightly different. Referring to Fig. 10 it will be seen that the alining pawls 127 for the change wheels are constantly in engagement with the V shaped notches formed in the alining disks 128 secured to the change printing wheels. These pawls 127 are pivoted upon a shaft 129, and each one has an upwardly and rearwardly projecting finger 130 equipped with a pin 131 about which is coiled one end of a spring 132. The other end of each spring surrounds a similar pin 133 extending from a lateral extension 134 of an arm 135 which is pivoted upon the shaft 129.

It will be seen from the above description that the pawls 127 will hold the change wheels in any position to which they may be moved by the levers 22. In order to lock the change wheels 23 from movement by the hand levers 22 during an operation of the machine, the arm 135 is provided with a roller 136 which plays in a cam groove 137 of a disk 138 that is given a complete revolution upon each operation of the machine. The configuration of the groove 137 is such, that as soon as the handle 113 is started the rearward end of the arm 135 is cammed downwardly carrying the pins 133 of the lateral extension 134 into contact with the pins 131 of the alining pawls 127, and thereby prevent the withdrawal of the pawls out of the notches in the disks 128 until the end of the operation.

I of course contemplate using any suitable form of alarms or bells for designating which clerk is operating the machine, in addition to the usual clerks' indication, but as such devices are so old and well known in the art it has not been thought necessary to show and describe them.

It will be seen from the foregoing description that each of the clerks is provided with a cash drawer for receiving the cash which is discharged into it from the rotary coin displayer, and that these drawers are locked so that only the proprietor can have access to them. It will be further seen that as each clerk has his own series of coin tubes, and as the discharge from these tubes is controlled by the setting handle for the counters, that no clerk can secure cash from the coin tubes of another without setting the machine to operate on the counter of the clerk representing that particular series of tubes and thus ringing a bell which will notify a certain clerk that his counter is being wrongfully operated.

If the amount of money tendered is the exact amount of the purchase, the indicators of the machine will show the identical amount shown in the coin displayer, and no clerk would ever dare put a less amount in the coin displayer than that shown by the indicators, as the proprietor in glancing at the machine would instantly see that the indicators showed a greater amount than that shown in the coin displayer. Further, the clerks also will keep watch of this special coin displayer to see that no amounts are placed in the displayer less than those indicated by the machine.

At the beginning of the day's business the proprietor places a certain specified amount in each series of coin tubes and bill receptacles. At the end of the day's business he removes the different coin tubes and bill receptacles, counts the amount of cash in each, and knows at once the amount that has been extracted. The amount of change given out by each clerk, added to the amount on his particular counter, which may be ascertained at once, equals the sum which should be found in his particular cash receiving drawer. As an additional check upon the amount withdrawn from any particular series of tubes, the proprietor always may examine the detail strip and ascertain just how much each clerk has withdrawn without counting the money in the tubes at all, as no clerk can withdraw any amount from the tubes without leaving a record of this act and the amount he has withdrawn. This record is always made in connection with a record of the amount of the sale, so that any mistake in giving change can be instantly detected by an examination of the detail strip. In other words, if the amounts withdrawn from the coin tubes, added to the amounts of the counters, do not correspond to the amounts found in the cash drawers, the proprietor can ascertain just which clerks have made mistakes, intentionally or unintentionally, and in just what transactions they made these mistakes.

One of the greatest sources of loss at the present day is the mistakes made by clerks in making change. While it is possible at the present time to know that a clerk's cash drawer is short at the end of the day's business, it is not known whether he made a mistake in giving change or whether the money has become lost in some unaccountable manner. With the present invention it can be determined at once whether the shortage in any particular clerk's account is occasioned by mistakes in making change or from other causes. For instance, if a particular clerk's counter shows sales of $25.00 and the detail strip shows that he had issued $10.00 in change, his cash drawer should contain $35.00. If the cash drawer does not contain this amount, by glancing over the detail strip it may be ascertained at once whether he made a mistake in making change and upon what particular transaction the mistake was made. If the change as represented by the detail strip is correct, then the shortage in the cash drawer is occasioned by less than the proper amount having been put into the cash drawer for some transaction. A further safeguard in the present invention is the fact that the clerk does not have access to the money in the cash drawer at any time except when he receives it and deposits it in the coin displayer. He would run considerable risk in retaining any part of this money rather than putting it into the coin displayer, as the amount in the displayer must show at all times to the proprietor, or to the other clerks, as being equal to, or greater than, the amount shown on the indicators. The effect of this is to compel the clerk who receives money for a certain transaction, to put it into the machine without holding any back, and after it is in the machine it is out of his reach altogether. Any time he withdraws money from the coin tubes he virtually signs a receipt for the amount withdrawn. In this manner there is very little likelihood of a clerk putting the wrong amount in the displayer, either intentionally or because of carelessness in counting the amount received, as he is liable to detection at once.

Having thus described my invention, what I claim as new and desire to secure by Letters Patent is:

1. In a machine of the class described, the combination with a plurality of money ejectors arranged in groups, one group for each clerk, of a series of companion totalizers, a printing mechanism for recording which group of money ejectors and totalizers are operated, and a common controlling device for the corresponding accounting, money ejecting and printing mechanisms.

2. In a machine of the class described, the combination with a plurality of money ejecting devices arranged in independent groups, of a plurality of companion counters, a common means for selecting the counter of the particular group of money ejecting devices, and a common controlling mechanism for all of the groups of money ejecting devices.

3. In a machine of the class described, the combination with a series of accounting devices, of a series of independent money ejecting mechanisms, a common controller for the accounting devices and the money ejecting mechanisms, independent money receiving receptacles, a common money depositing device therefor, and an operating mechanism common to the accounting, depositing and ejecting devices.

4. In a machine of the class described, the combination with a plurality of money holding and ejecting devices, one for each clerk, of means common to all of said devices for determining which one is to be operated, and a common selective mechanism and connections arranged to select the proper amounts for ejection from any one of said devices.

5. In a machine of the class described, the combination with a plurality of similar groups of coin tubes, of separate and independent sets of coin ejectors, one set for each group of tubes, a set of manipulative devices common to and having connections for controlling all said ejectors, and a main operating mechanism having connections to actuate said ejectors under control of said manipulative devices.

6. In a machine of the class described, the combination with a printing mechanism arranged to print the amounts of sales, of a plurality of money ejecting mechanisms arranged in groups, one group for each clerk, and mechanism for printing the amount ejected by any particular clerk in conjunction with the amount of the sale.

7. In a machine of the class described, the combination with mechanism for printing the amounts of different transactions, of a plurality of money ejecting devices arranged in groups, one group for each clerk, a common ejector controlling mechanism for said groups, and mechanism for printing and designating the amounts ejected from any particular group.

8. In a machine of the class described, the combination with a plurality of money ejecting devices arranged in groups, one group for each clerk, of a common controlling mechanism for said groups of devices, a series of independent money receiving receptacles, and a common operating mechanism for the money ejecting devices and the money receiving receptacles.

9. In a machine of the class described, the combination with a series of counters, of a plurality of money ejecting mechanisms arranged in groups, one group for each clerk, of a series of money receiving receptacles, and a common operating mechanism for the counters, money receiving receptacles and ejecting mechanisms.

10. In a machine of the class described, the combination with a plurality of accounting devices, of a plurality of money ejecting devices arranged in groups, one group for each accounting device, a common operating mechanism for the money ejecting devices, a common controller for the accounting devices, and mechanism for operating the common controller and the common operating mechanism of the ejector devices.

11. In a machine of the class described, the combination with a mechanism for registering independently the amount of sale by different clerks, of mechanism for recording independently the amount of sale by different clerks, a plurality of money dispensing devices arranged in groups, one group for each clerk, a common controller for the money dispensing devices, and means for recording the amount dispensed by each clerk.

12. In a machine of the class described, the combination with a main operating mechanism, of a plurality of accounting devices, means for independently recording the amounts added on the accounting devices, a plurality of independent money receiving devices, a plurality of independent money dispensing devices, means for printing the amount dispensed from any particular one of the dispensing devices in conjunction with the amount of the sale, and connections between the several devices and the main operating mechanism.

13. In a machine of the class described, the combination with a plurality of accounting mechanisms, of manipulative devices for controlling the amount to be accounted, a plurality of groups of change making devices, manipulative devices for controlling the amount of change to be withdrawn, and a common operating mechanism for the accounting mechanisms and the change making devices.

14. In a machine of the class described, the combination with a plurality of accounting mechanisms, of keys for controlling the amount to be accounted, a plurality of groups of change making devices, adjustable levers for controlling the amount of change to be withdrawn, and a common operating mechanism for the accounting mechanisms and the change making devices.

15. In a machine of the class described, the combination with a plurality of accounting mechanisms, of companion groups of change making devices, a common operating mechanism for the accounting mechanisms and change making devices, and common means for predetermining which one of the accounting mechanisms and its companion change making device is to be actuated by the operating mechanism.

16. In a machine of the class described, the combination with a plurality of accounting mechanisms, of companion groups of change making devices, a common operating mechanism for the accounting mechanisms and change making devices, and an adjusting device for predetermining which one of the accounting mechanisms and its companion change making device is to be actuated by the operating mechanism.

17. In a change maker, the combination with a plurality of groups of change making devices, of manipulative devices common to all of the groups of change making devices for controlling the amount of change to be withdrawn, an operating mechanism, and means for predetermining which group of change making devices is to be actuated by the operating mechanism.

18. In a change maker, the combination with a plurality of groups of change making devices, of adjustable levers common to all of the groups of change making devices for controlling the amount of change to be withdrawn, an operating mechanism, and means for predetermining which group of change making devices is to be actuated by the operating mechanism.

19. In a change maker, the combination with a plurality of groups of change making devices, of manipulative devices common to all of the groups of change making devices for controlling the amount of change to be withdrawn, an operating mechanism, and an adjusting device for predetermining which group of change making devices is to be actuated by the operating mechanism.

20. In a change maker, the combination with a plurality of coin-holders, of a rock shaft, and a plurality of ejecting devices flexibly connected to said shaft, and means for selectively locking certain ejectors.

21. In a change maker, the combination with manipulative devices for controlling the amount of change to be withdrawn from the change maker, of a rock shaft, and ejecting devices mounted on said shaft and flexibly connected thereto.

22. In a change maker, the combination with a series of bill handling devices, including ejector means for said bills, of an actuator common to said devices, and selective means common to the bill handling devices for determining which one will be operated.

23. In a machine of the class described, the combination with a plurality of similar groups of coin holding devices, of ejecting devices for all said coin holding devices, a main actuator for all said ejecting devices, and means for connecting the ejecting devices of any group of coin holding devices to said main actuator.

24. In a machine of the class described, the combination with a plurality of bill handling devices including ejector means for said bills, of an actuator common to said devices, a selective means common to the bill handling devices for determining which one will be operated, and an accounting mechanism for recording such operations.

25. In a machine of the class described, the combination with a plurality of money handling devices arranged in groups, one group for each clerk, a common actuator for said devices, means for printing the amount paid out by the machine, and means for identifying each amount paid out, with the particular group of money handling devices from which it was paid out.

26. In a machine of the class described, the combination with a plurality of totalizers, of companion groups of change making devices, an operating mechanism, means for determining the amount to be added upon any one of the totalizers, means for determining the amount of change to be withdrawn from the companion group of change making devices, and mechanism for recording the amount added and the amount withdrawn upon the operation of the operating mechanism.

27. In a machine of the class described, the combination with a plurality of totalizers, of companion groups of change making devices, an operating mechanism, keys for determining the amount to be added upon any one of the totalizers, levers for determining the amount of change to be withdrawn from the companion group of change making devices, and mechanism for recording the amount added and the amount withdrawn upon the operation of the operating mechanism.

28. In a machine of the class described, the combination with a plurality of similar groups of coin holding devices, and ejecting means for all said coin holding devices, of a reciprocating member for actuating all said ejecting means, and a manipulative lever and connections for placing the ejecting means of any group of coin holding devices in operative connection with said reciprocating member.

29. The combination with a plurality of groups of change making devices, means for placing any one of said devices in operative condition, a plurality of levers for operating said devices, and a movable member carrying said levers.

30. The combination with a plurality of groups of change making devices, means for placing any one of said devices in operative condition, a plurality of levers for operating said devices, and a longitudinally movable bar carrying said levers.

31. The combination with a plurality of groups of change making devices, a plurality of normally disconnected levers for operating said devices, a movable member carrying said levers, and an adjustable element for connecting any one of said levers with its change making devices.

32. The combination with a plurality of bill handling devices, one for each clerk, a series of normally disconnected movable elements for actuating said devices, means for connecting the movable elements with the bill handling devices, and means for operating one of said elements after it is connected.

33. The combination with a plurality of bill handling devices, one for each clerk, a series of normally disconnected movable elements for actuating said devices, an operating mechanism, means for connecting the movable elements with the bill handling devices, and a common means for determining which one of said elements is to be operated.

34. In a money changer, the combination with a bill handling device, including storage and unwinding rolls, a movable element for operating the unwinding roll normally disconnected therefrom, and means for connecting the movable element and the unwinding roll.

35. In a money changer, the combination with a bill handling device, including storage and unwinding rolls, a vertically movable bar for operating the unwinding roll normally disconnected therefrom, and an adjustable change determining lever for connecting the movable element and the unwinding roll.

36. In a machine of the class described, the combination with a plurality of groups of change delivering devices including ejectors, of a main actuating element for said ejectors with means for giving said actuating element excursions of invariable extent, manipulative means for connecting the ejectors of any group to said main actuating element, setting elements, and means controlled thereby for selectively obstructing the ejectors of any connected group.

37. In a machine of the class described, the combination with a plurality of groups of change delivering devices including ejectors, of a common driving device to which any group of ejectors may be connected for operation and means manually positioned selectively to obstruct the ejectors of the connected group.

38. In a machine of the class described, the combination with a plurality of groups of change delivering devices including ejectors, of a common driving device, adjustable arms for connecting the ejectors of any desired group to the driving device, and means manually positioned selectively to obstruct the ejectors of the connected group.

39. In a machine of the class described, the combination with a plurality of groups of change delivering devices including ejectors, of a common driving device, a determining lever manually differentially operable, devices controlled by said lever for connecting any desired group of ejectors to said driving device, and means manually positioned selectively to obstruct the ejectors of the connected group.

40. In a machine of the class described, the combination with a plurality of groups of change delivering devices including ejectors, of a common driving device, means for connecting any desired group of ejectors to said driving device, and ribbed cylinders manually differentially positioned selectively to obstruct the ejectors of the connected group.

41. In a machine of the class described, the combination with a plurality of groups of change delivering devices including ejectors, of a common driving device, means for connecting any desired group of ejectors to said driving device, a type carrier differentially set by said connecting means, mechanism for selectively obstructing the ejectors of any desired group, type carriers differentially positioned by said obstructing mechanism, and devices for taking imprints from all said type carriers.

42. In a machine of the class described, the combination with a plurality of groups of change delivering devices including ejectors, and a common driving device therefor, of a lever and devices operated thereby for connecting any desired group of ejectors to said driving device, additional levers, means controlled by said additional levers for selectively obstructing the ejectors of any desired group, printing type carriers positioned by each of said levers, and means for taking imprints from all said type carriers.

In testimony whereof I affix my signature in the presence of two witnesses.

WILLIAM H. MUZZY.

Witnesses:
ROYAL W. FAIRCHILD,
HOWARD S. SMITH.